Sept. 23, 1930.  F. G. CRAIG  1,776,250
BRAKE CYLINDER
Filed July 29, 1929
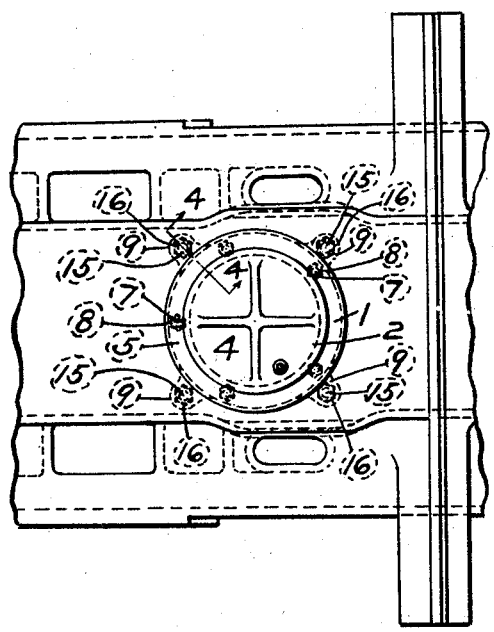
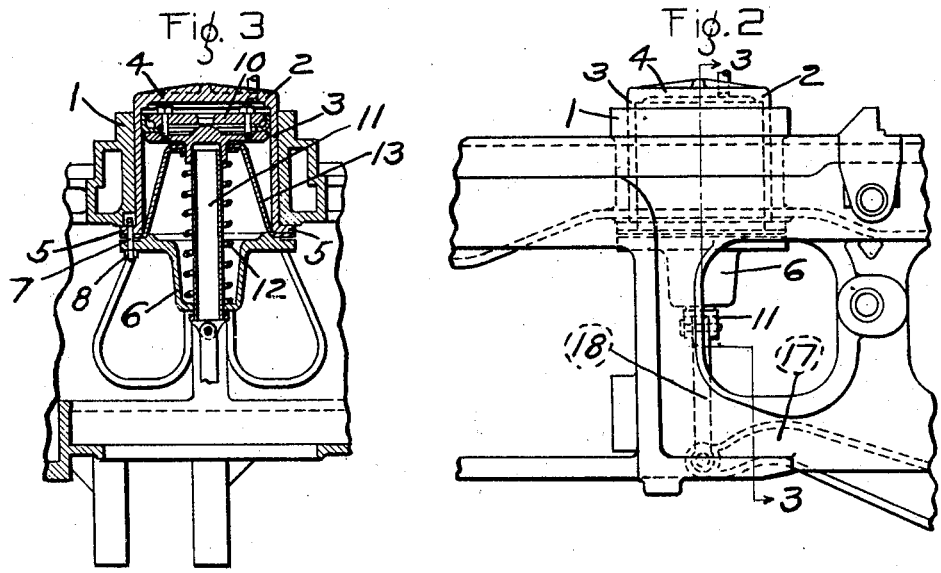
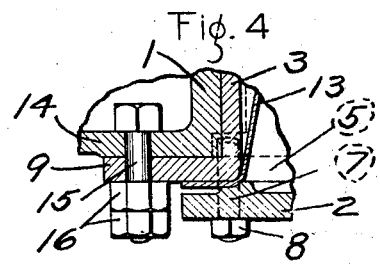
INVENTOR
FRED G. CRAIG
BY  Wm. M. Brady
ATTORNEY Patented Sept. 23, 1930

1,776,250

UNITED STATES PATENT OFFICE

FRED G. CRAIG, OF ST. LOUIS, MISSOURI, ASSIGNOR TO THE AMERICAN BRAKE COMPANY, OF ST. LOUIS, MISSOURI, A CORPORATION OF MISSOURI

BRAKE CYLINDER

Application filed July 29, 1929. Serial No. 382,058.

This invention relates to the mounting of brake cylinder devices in the bed frame of railway locomotives.

Heretofore it has been the practice to build up the brake cylinder device in the bed frame of the locomotive. In building up the brake cylinder device, the bed frame is provided with a circular opening in which a tubular bushing is fitted forming the body of the brake cylinder. The usual brake cylinder piston and piston rod are then inserted in the bushing after which the pressure head and non-pressure head are drawn tight against the opposite ends of the bushing through the medium of a plurality of stud bolts having screw-threaded connections with the bed frame.

This method of forming the brake cylinder device, by building it up on the bed frame, is objectionable for a number of reasons, some of which are: the time and labor required to assemble the several parts of the brake cylinder with the bed frame; the difficulty in obtaining a suitable air tight bushing; the difficulty of making the joints between the several parts of the device air tight and the difficulty in testing the device to ascertain whether or not it is air tight.

The principal object of my invention is to provide a brake cylinder device which may be inserted in and secured to the locomotive bed frame as a unit and which will be free of the above mentioned objectionable features.

Other objects and advantages will appear in the following more detailed description of the invention.

In the accompanying drawing, Figure 1 is a plan view of a portion of a locomotive bed frame embodying my improved brake cylinder mounting; Fig. 2 is a side elevational view of the same; Fig. 3 is a cross sectional view on the line 3—3 of Fig. 2 and Fig. 4 is an enlarged detail sectional view of a portion of the brake cylinder mounting taken on the line 4—4 of Fig. 1.

As shown in the accompanying drawing, the locomotive bed frame may comprise a single integral casting having, at desired locations throughout its length, integral vertically disposed annular walls 1, each of which defines a recess having open ends and is adapted to receive a brake cylinder device 2. In the drawing only one of the annular walls 1 is illustrated, but it will be understood that any desired number of such walls may be provided.

According to my invention the brake cylinder device 2 may comprise a cylinder portion 3 having the pressure end thereof closed by an integral pressure head 4. The opposite or non-pressure end of the cylinder is open and is provided with an outturned flange 5, and to this flange a non-pressure head 6 is secured by a plurality of bolts 7 and nuts 8.

The flange 5 is of general circular form and at intervals about its circumference is provided with extensions or lugs 9 having bolt receiving openings formed therein.

Contained in the brake cylinder is the usual piston 10, to which is secured a piston rod 11, the outer end of which extends through a centrally arranged opening in the non-pressure head 6. Interposed between the non-pressure head and the piston and surrounding the piston rod 11 is the usual release spring 12. The brake cylinder may also contain a filter device 13 for extracting foreign matter from the air which enters the non-pressure side of the brake cylinder through the space between the piston rod and the non-pressure head.

All of the parts of the brake cylinder device may be assembled and tested as a unit preparatory to mounting it in the bed frame of a locomotive.

In mounting the brake cylinder device in the bed frame, the pressure head end of the cylinder portion is inserted through the open lower end of the recess defined by the annular wall 1 and the brake cylinder device, as a unit, is moved upwardly to its proper position in which, the lugs 9 engage the under side of a horizontally disposed portion 14 of the bed frame. The bolt receiving openings in the lugs 9 are now brought into registration with corresponding openings in the portion 14, and downwardly through these registering openings the threaded ends of securing bolts 15 are passed. Nuts 16 are now turned on the threaded ends of the bolts which engage the lugs 9 and hold them in close contact with the portion 14 thus holding the brake cylinder device as a unit securely assembled with the bed frame. It will be noted that the lugs 9 are of such length and that the openings therein are so positioned that the non-pressure head 6 will not interfere with the turning of the nuts 16.

After the brake cylinder device has been mounted in the bed frame as just described, the lower end of the piston rod 11 may be operatively connected to the end of the usual brake lever 17 by a link 18.

From the foregoing description it will be seen that the brake cylinder device may be assembled and tested by the manufacturer of such devices, then shipped assembled to the user and finally applied as a unit to a locomotive bed frame or the like.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a mounting for a brake cylinder device, the combination with a vehicle frame having an opening therein, of a brake cylinder device insertable in said opening as a unit, said device comprising a cylinder portion and a supporting flange on said cylinder portion adapted to engage the vehicle frame, and means securing said flange to the vehicle frame.

2. In a mounting for a brake cylinder device, the combination with a vehicle frame having an annular wall, of a brake cylinder device insertable as a unit in the space defined by the interior of said wall, said device comprising a cylinder portion and a flange on said cylinder portion adapted to engage the vehicle frame, and means securing said flange to the vehicle frame.

3. In a mounting for a brake cylinder device, the combination with a vehicle frame having an annular wall forming an open ended cylinder, of a brake cylinder device adapted to be inserted as a unit through the open end of the cylinder, said device comprising a cylinder portion having a slip fit with said annular wall, and means for securing said device to said frame when it is positioned in said cylinder.

4. In a mounting for a brake cylinder device, the combination with a vehicle frame having an opening therein, of a brake cylinder device having a cylinder portion adapted to extend into said opening, a non-pressure head secured to said cylinder portion, and lugs on said cylinder portion adapted to be secured to said frame for holding said device as a unit assembled with the frame.

5. In a mounting for a brake cylinder device, the combination with a vehicle frame having an opening therein, of a brake cylinder device having a cylinder portion adapted to extend into said opening, a flange on one end of said cylinder portion, a non-pressure head secured to said flange, extensions on said flange and means for securing said extensions to said frame.

6. In a mounting for a brake cylinder device, the combination with a vehicle frame having an opening therein, of a brake cylinder device comprising a cylinder portion, a pressure head at one end of the cylinder of no greater diameter than the cylinder portion, a flange on the opposite end of the cylinder portion extending outwardly therefrom, a non-pressure head secured to said flange, said cylinder portion and pressure head being insertable in said opening, and extensions on said flange adapted to be secured to said frame for maintaining said device assembled, as a unit, with the frame.

7. A brake cylinder device comprising a cylinder portion, a pressure head at one end of the cylinder portion and integral therewith, an outwardly directed flange on the opposite end of the cylinder portion, a non-pressure head secured to said flange, and securing lugs projecting outwardly from said flange.

In testimony whereof I have hereunto set my hand, this 22nd day of July, 1929.

FRED G. CRAIG.